US012747517B2

(12) United States Patent
Xu et al.

(10) Patent No.: US 12,747,517 B2
(45) Date of Patent: Sep. 29, 2026

(54) METHOD FOR PREPARING ULTRA-FINE AND UNIFORM ACRYLAMIDE-BASED POLYMER HYDROGEL FILAMENT AND USE THEREOF

(71) Applicant: Beijing Taijieweiye Technology Co., Ltd, Beijing (CN)

(72) Inventors: Yongsong Xu, Beijing (CN); Jian Wu, Beijing (CN); Hang Tang, Beijing (CN); Chuan Qin, Beijing (CN); Lei Mu, Beijing (CN); Fei Chen, Beijing (CN)

(73) Assignee: Beijing Taijieweiye Technology Co., Ltd, Beijing (CN)

( * ) Notice: Subject to any disclaimer, the term of this patent is extended or adjusted under 35 U.S.C. 154(b) by 517 days.

(21) Appl. No.: 18/259,936

(22) PCT Filed: Nov. 2, 2021

(86) PCT No.: PCT/CN2021/128036

§ 371 (c)(1),
(2) Date: Jun. 29, 2023

(87) PCT Pub. No.: WO2022/142705

PCT Pub. Date: Jul. 7, 2022

(65) Prior Publication Data

US 2024/0093410 A1 Mar. 21, 2024

(30) Foreign Application Priority Data

Dec. 29, 2020 (CN) ........................ 202011585756.9

(51) Int. Cl.
*C08F 20/56* (2006.01)
*C08L 33/26* (2006.01)
(Continued)

(52) U.S. Cl.
CPC ............... *D01D 5/38* (2013.01); *C08F 20/56* (2013.01); *D01F 6/16* (2013.01); *D01F 6/26* (2013.01);
(Continued)

(58) Field of Classification Search
None
See application file for complete search history.

(56) References Cited

U.S. PATENT DOCUMENTS

2012/0289995 A1 11/2012 Constant et al.
2016/0367730 A1 12/2016 Constant et al.

FOREIGN PATENT DOCUMENTS

CN 1617694 A 5/2005
CN 104398283 A 3/2015
(Continued)

OTHER PUBLICATIONS

Chinese First Office Action for Application No. 202011585756.9 dated Feb. 10, 2021, 6 pages.
(Continued)

*Primary Examiner* — Richard A. Huhn
(74) *Attorney, Agent, or Firm* — TraskBritt

(57) ABSTRACT

A method for preparing an ultra-fine and uniform acrylamide-based polymer hydrogel filament. The method comprises: formulating a reaction solution of acrylamide-based polymer under ice bath conditions, and drawing the reaction solution into a reaction tube by a syringe; parabolically bending the two ends of the reaction tube upward; hanging the reaction tube for 2 h-8 h, and performing a baking reaction to obtain an acrylamide-based polymer hydrogel; vacuum drying the reaction tube for 4 h-8 h to obtain a dry filament of acrylamide-based polymer; cutting the reaction tube to obtain a plurality of short polymerization tubes having a preset length; pushing the dry filament of acryl-
(Continued)

amide-based polymer out of the short tube by a stainless steel wire; purifying same in a soaking solution to obtain an expanded filament of acrylamide-based polymer; and drying same to obtain a acrylamide-based polymer hydrogel filament having a preset external diameter.

8 Claims, 2 Drawing Sheets

(51) Int. Cl.

| | |
|---|---|
| ***D01D 5/38*** | (2006.01) |
| ***D01F 6/16*** | (2006.01) |
| ***D01F 6/26*** | (2006.01) |

(52) U.S. Cl.

CPC ........... *C08F 2810/20* (2013.01); *C08L 33/26* (2013.01); *D10B 2321/00* (2013.01); *D10B 2321/08* (2013.01); *D10B 2509/00* (2013.01)

(56) References Cited

FOREIGN PATENT DOCUMENTS

| | | |
|---|---|---|
| CN | 107754025 A | 3/2018 |
| CN | 112300413 A | 2/2021 |

OTHER PUBLICATIONS

International Search Report for International Application No. PCT/CN2021/128036 dated Nov. 24, 2023, 2 pages.

International Written Opinion for International Application No. PCT/CN2021/128036 dated Nov. 24, 2023, 4 pages.

Chinese Search Report for Chinese Application No. 202011585756.9, dated Feb. 10, 2021, 1 pages.

Notification to Grant Patent Right for Invention for Chinese Application No. 202011585756, dated Mar. 12, 2021, 3 pages with English translation.

METHOD FOR PREPARING ULTRA-FINE AND UNIFORM ACRYLAMIDE-BASED POLYMER HYDROGEL FILAMENT AND USE THEREOF

CROSS-REFERENCE TO RELATED APPLICATIONS

This application is a national phase entry under 35 U.S.C. § 371 of International Patent Application PCT/CN2021/128036, filed Nov. 2, 2021, designating the United States of America and published as International Patent Publication WO 2022/142705 A1 on Jul. 7, 2022, which claims the benefit under Article 8 of the Patent Cooperation Treaty of Chinese Patent Application Serial No. 202011585756.9, filed Dec. 29, 2020.

TECHNICAL FIELD

The disclosure relates to the field of medical technologies and, in particular, to a method for preparing an ultra-fine and uniform acrylamide-based polymer hydrogel filament and use thereof.

BACKGROUND

An aneurysm, as a very common vascular disease, is a manifestation of localized or diffuse expansion or bulging of an arterial wall due to lesion or injury of the arterial wall. The main manifestations are swelling and pulsating mass, which can occur in any part of an arterial system. Once an aneurysm ruptures, serious consequences may result. For example, if an intracranial aneurysm ruptures, it may result in subarachnoid hemorrhage, and even cause vasospasm and large-scale cerebral infarction in severe cases, leading to hemiplegia and coma. At present, therapeutic regimens for the aneurysm mainly include open surgery and endovascular interventional therapy. Open surgery requires opening the human body cavity that wraps the aneurysm, such as craniotomy and thoracotomy, which causes huge damage to the patient's body, and has a long recovery period after operation. The endovascular interventional therapy of the aneurysm has become the first choice of clinical treatment for many medical experts because of its advantages of minimally invasive, safe and effective.

At present, coils are mainly used as the embolic material in the endovascular interventional therapy of the aneurysm. Even if ordinary platinum coils show complete dense embolism on imaging, the actual filling rate is only 20% to 30%, and the remaining 70% to 80% need to be filled by thrombus. However, the thrombus is unstable, and it may be dissolved, causing the aneurysm to recur. Ordinary platinum coils may also be compressed under the impact of blood flow, causing the aneurysm to recur. The use of hydrogel-modified coils can reduce the number of coils used, reduce the mass effect of coil products, obtain a higher long-term embolization rate, and reduce a recurrence rate and a retreatment rate.

However, the modification of coils requires ultra-fine and uniform hydrogel filaments, it is impossible or difficult to obtain ultra-fine and uniform hydrogel filaments by traditional techniques. Since a hydrogel polymer is an inert cross-linked polymer and insoluble in any organic solvent, the drawing process is very difficult. Meanwhile, since the hydrogel is brittle after expanding with water, the fracture force value in the dry state is small, which is also another reason why it is difficult to draw.

BRIEF SUMMARY

In order to overcome the disadvantages in the prior art, the disclosure provides a method for preparing an ultra-fine and uniform acrylamide-based polymer hydrogel filament. According to the method, a reaction solution of an acrylamide-based polymer is prepared under an ice bath condition and then pumped into a polymerization reaction tube; the polymerization reaction tube is parabolically suspended in a constant-temperature drying oven for baking reaction so that the reaction solution is fully cross-linked to produce an acrylamide-based polymer hydrogel; hydrogel is then dried in a vacuum drying oven to obtain a dry filament of the acrylamide-based polymer; the polymerization reaction tube is cut into short tubes and the dry filament of the acrylamide-based polymer is pushed out of the short tubes by a stainless steel wire and soaked in a soaking solution to obtain an expanded filament of the acrylamide-based polymer filament; and two ends of the expanded filament are fixed so that the expanded filament is dried naturally to obtain an ultra-fine and uniform acrylamide-based polymer hydrogel filament. The processing length of the acrylamide-based polymer hydrogel filament can be customized according to the needs. A second object of the disclosure is to provide use of an ultra-fine and uniform acrylamide-based polymer hydrogel filament for modifying an embolic material coil, which can reduce the number of coils used, reduce the mass effect of coils, and also obtain a higher long-term embolization rate, and lower recurrence rate and retreatment rate.

To achieve the above objects, in a first aspect, the disclosure provides a method for preparing an ultra-fine and uniform acrylamide-based polymer hydrogel filament, including:

- preparing a reaction solution of an acrylamide-based polymer under an ice bath condition, and pumping the reaction solution into a polymerization reaction tube by a syringe, wherein the acrylamide-based polymer comprises an acrylic acid-acrylamide copolymer or an acrylamide homopolymer, the reaction solution of the acrylic acid-acrylamide copolymer comprises 0.03 g/mL to 0.05 g/mL of sodium hydroxide, 0.07 g/mL to 0.14 g/mL of acrylic acid, 1.07 g/mL to 2.13 g/mL of acrylamide, 0.0005 g/mL to 0.001 g/mL of an amine crosslinking agent and 0.0009 g/mL to 0.0025 g/mL of an initiator, and the reaction solution of the acrylamide homopolymer comprises 0.03 g/mL to 0.05 g/mL of sodium hydroxide, 1.07 g/mL to 2.13 g/mL of acrylamide, 0.0005 g/mL to 0.001 g/mL of an amine crosslinking agent and 0.0009 g/mL to 0.0025 g/mL of an initiator;
- parabolically bending the polymerization reaction tube with two ends upward;
- suspending the parabolically bent polymerization reaction tube in a constant-temperature drying oven at a temperature of 40° C. to 60° C. for 2 h to 8 h for baking reaction so that components in the reaction solution are fully cross-linked to obtain an acrylic acid-acrylamide copolymer hydrogel or an acrylamide homopolymer hydrogel;
- vacuum drying the polymerization reaction tube containing the acrylic acid-acrylamide copolymer hydrogel or the acrylamide homopolymer hydrogel in a vacuum drying oven at a temperature of 40° C. to 60° C. for 4 h to 8 h so that water in the acrylic acid-acrylamide copolymer hydrogel or the acrylamide homopolymer hydrogel sublimes to obtain a dry filament of the acrylic acid-acrylamide copolymer or a dry filament of the acrylamide homopolymer;

cutting the polymerization reaction tube containing the dry filament of the acrylic acid-acrylamide copolymer or the dry filament of the acrylamide homopolymer into a plurality of short polymerization reaction tubes having a preset length and containing the dry filament of the acrylic acid-acrylamide copolymer or the dry filament of the acrylamide homopolymer;

pushing the dry filament of the acrylic acid-acrylamide copolymer or the dry filament of the acrylamide homopolymer out of the short polymerization reaction tubes by a stainless steel wire matching the short polymerization reaction tubes in terms of inner diameter;

purifying the dry filament of the acrylic acid-acrylamide copolymer or the dry filament of the acrylamide homopolymer with a soaking solution at a preset ratio for 24 h to 36 h to obtain an expanded filament of the acrylic acid-acrylamide copolymer or an expanded filament of the acrylamide homopolymer; and fixing two ends of the expanded filament of the acrylic acid-acrylamide copolymer or the expanded filament of the acrylamide homopolymer and naturally drying the expanded filament to obtain an acrylic acid-acrylamide copolymer hydrogel filament or acrylamide homopolymer hydrogel filament having a preset outer diameter.

Preferably, the polymerization reaction tube has an inner diameter of 0.2 mm to 0.5 mm.

Preferably, the polymerization reaction tube has a length of 50 cm to 100 cm.

Preferably, the material of the polymerization reaction tube includes polypropylene, polyethylene, polyamide (PA) or polyethylene terephthalate.

Preferably, in the step of suspending the parabolically bent polymerization reaction tube in the constant-temperature drying oven at a temperature of 40° C. to 60° C. for 2 h to 8 h for baking reaction, the baking reaction is carried out at 50° C.

Preferably, the vacuum degree of the vacuum drying oven is not less than 0.08 MPa.

Preferably, the preset length is within a range of 5 cm to 15 cm.

Preferably, the soaking solution is purified water or water for injection; the preset ratio refers to a ratio of the volume of the soaking solution to the length of the dry filament of the acrylic acid-acrylamide copolymer or the dry filament of the acrylamide homopolymer and the ratio is within a range of 2 to 10.

Preferably, the preset outer diameter is 0.08 mm.

In the first aspect of the disclosure, there is provided a method for preparing an ultra-fine and uniform acrylamide-based polymer hydrogel filament. According to the method, a reaction solution of an acrylamide-based polymer is prepared under an ice bath condition and then pumped into a polymerization reaction tube; the polymerization reaction tube is parabolically suspended in a constant-temperature drying oven for baking reaction so that the reaction solution is fully cross-linked to form an acrylamide-based polymer hydrogel; hydrogel is then dried in a vacuum drying oven to obtain a dry filament of the acrylamide-based polymer; the polymerization reaction tube is cut into short tubes and the dry filament of the acrylamide-based polymer is pushed out of the short tubes by a stainless steel wire and soaked in a soaking solution to obtain an expanded filament of the acrylamide-based polymer filament; and two ends of the expanded filament are fixed so that the expanded filament is dried naturally to obtain a stable ultra-fine and uniform acrylamide-based polymer hydrogel filament. The processing length of the acrylamide-based polymer hydrogel filament can be customized according to the needs.

In a second aspect, there is provided use of an ultra-fine and uniform acrylamide-based polymer hydrogel filament for modifying an embolic material coil.

The use of an ultra-fine and uniform acrylamide-based polymer hydrogel filament for modifying an embolic material coil used in an aneurysm surgery, provided in the second aspect, can reduce the number of coils used, reduce the mass effect of coils, and also obtain a higher long-term embolization rate, and lower recurrence rate and retreatment rate.

DETAILED DESCRIPTION

In order to make the object, technical solutions and advantages of the invention clearer, the invention is further described in detail below with reference to the accompanying drawings. Obviously, the described embodiments are merely part but not all the embodiments of the invention. All other embodiments obtained by a person of ordinary skill in the art based on the embodiments of the disclosure without creative efforts shall fall within the protection scope of the disclosure.

In the first embodiment of the disclosure, there is provided a method for preparing an ultra-fine and uniform acrylamide-based polymer hydrogel filament. According to the method, a reaction solution of an acrylamide-based polymer is prepared under an ice bath condition and then pumped into a polymerization reaction tube; the polymerization reaction tube is parabolically suspended in a constant-temperature drying oven for baking reaction so that the reaction solution is fully cross-linked to form an acrylamide-based polymer hydrogel; hydrogel is then dried in a vacuum drying oven to obtain a dry filament of the acrylamide-based polymer; the polymerization reaction tube is cut into short tubes and the dry filament of the acrylamide-based polymer is pushed out of the short tubes by a stainless steel wire and soaked in a soaking solution to obtain an expanded filament of the acrylamide-based polymer filament; and two ends of the expanded filament are fixed so that the expanded filament is dried naturally to obtain an ultra-fine and uniform acrylamide-based polymer hydrogel filament. The processing length of the acrylamide-based polymer hydrogel filament can be customized according to the needs.

Figure 1:
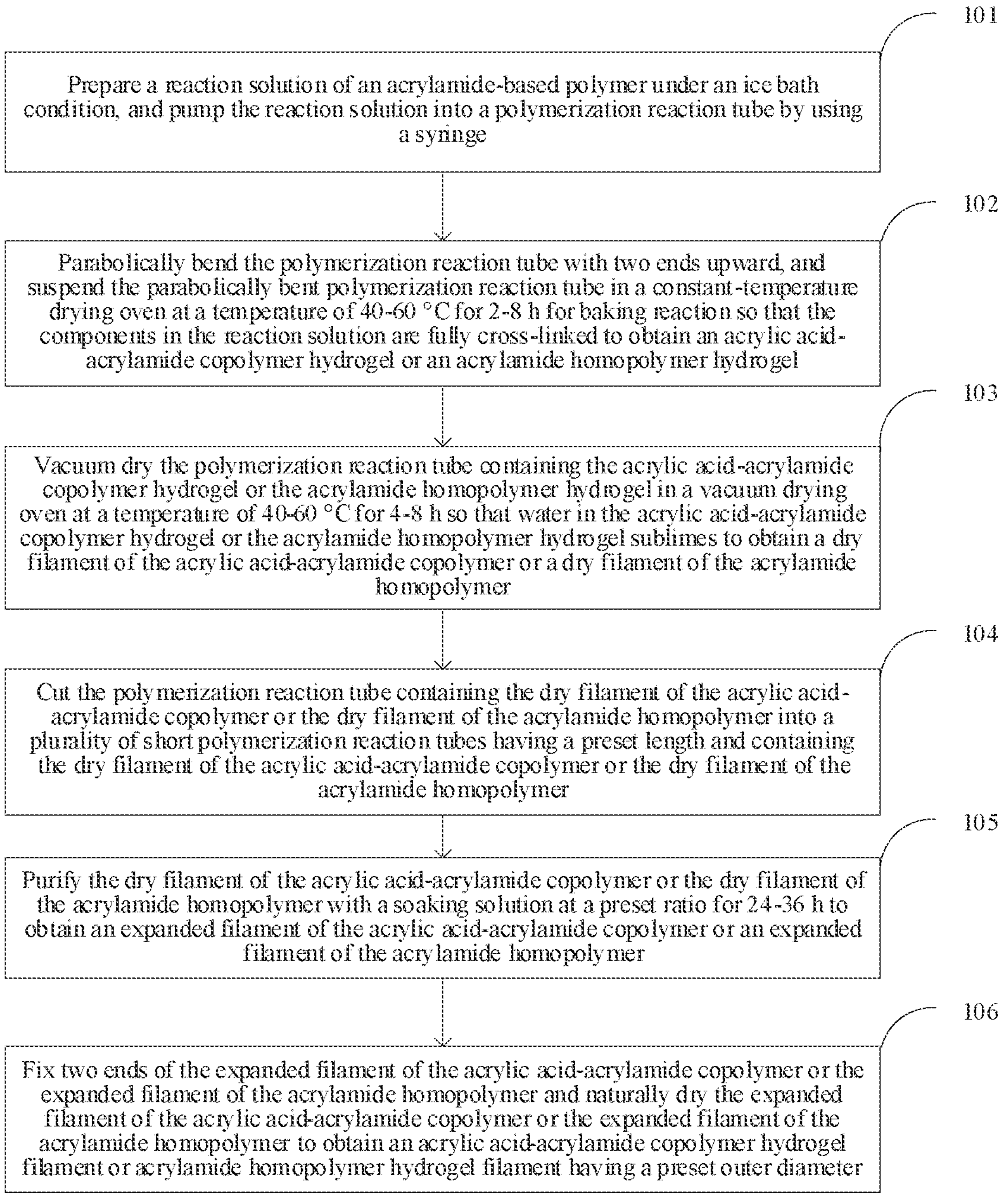
FIG. 1 is a flow chart of a method for preparing an ultra-fine and uniform acrylamide-based polymer hydrogel filament according to a first embodiment of the disclosure.

FIG. 1 is a flow chart of a method for preparing an ultra-fine and uniform acrylamide-based polymer hydrogel filament according to a first embodiment of the disclosure. As shown in FIG. 1, the method includes the following steps.

In step 101, a reaction solution of an acrylamide-based polymer is prepared under an ice bath condition and pumped into a polymerization reaction tube by a syringe.

The acrylamide-based polymer here includes an acrylic acid-acrylamide copolymer or an acrylamide homopolymer.

First of all, the reaction solution of the acrylic acid-acrylamide copolymer, prepared under an ice bath condition, includes the following low molecular monomers in proportion: 0.03 g/mL to 0.05 g/mL of sodium hydroxide, 0.07 g/mL to 0.14 g/mL of acrylic acid, 1.07 g/mL to 2.13 g/mL of acrylamide, 0.0005 g/mL to 0.001 g/mL of an amine crosslinking agent and 0.0009 g/mL to 0.0025 g/mL of an initiator.

The reaction solution of the acrylamide homopolymer, prepared under an ice bath condition, includes the following low molecular monomers in proportion:

0.03 g/mL to 0.05 g/mL of sodium hydroxide, 1.07 g/mL to 2.13 g/mL of acrylamide, 0.0005 g/mL to 0.001 g/mL of an amine crosslinking agent and 0.0009 g/mL to 0.0025 g/mL of an initiator.

The amine crosslinking agent here is preferably tetramethylethylenediamine or N,N'-methylenebisacrylamide. The initiator here is preferably a peroxygen compound, such as active compounds such as potassium persulfate, ammonium persulfate or sodium persulfate.

The ice bath functions to delay the time of the cross-linking reaction. The prepared reaction solution is placed in a beaker or Erlenmeyer flask.

A hollow tube with an inner diameter of 0.2 mm to 0.5 mm is used as the polymerization reaction tube, and the material of the tube is commonly a polymer material such as polypropylene, polyethylene, polyamide (PA) or polyethylene terephthalate. A syringe (5 ml or 10 ml) with a needle is inserted into the cavity of the polymerization reaction tube at one end, and the other end of the polymerization reaction tube is immersed in the reaction solution. A plunger of the syringe is then pulled to pump the reaction solution into the polymerization reaction tube in a short time. During the pumping process, the polymerization reaction tube should be fully filled with the reaction solution without air bubbles, since the generation of air bubbles will affect the surface quality of the subsequently generated dry hydrogel filament. In order to improve the efficiency of preparation, the length of a single polymerization reaction tube can be set to 50 cm to 100 cm, or a syringe with a large needle can be used to pump the reaction solution into multiple polymerization reaction tubes at the same time.

In step 102, the polymerization reaction tube is parabolically bent with two ends upward, and the parabolically bent polymerization reaction tube is suspended in a constant-temperature drying oven at a temperature of 40° C. to 60° C. for 2 h to 8 h for baking reaction so that the components in the reaction solution are fully cross-linked to obtain an acrylic acid-acrylamide copolymer hydrogel or an acrylamide homopolymer hydrogel.

The polymerization reaction tube containing the reaction solution, obtained in step 101, is parabolically bent with two ends upward to prevent the reaction solution from leaking during the reaction. The parabolically bent polymerization reaction tube is suspended in a constant-temperature drying oven for baking reaction. Sufficient reaction time can ensure that the low molecular monomers can be fully cross-linked to obtain a polymer hydrogel. In a preferred solution, the baking temperature is preferably set to 50° C.

In step 103, the polymerization reaction tube containing the acrylic acid-acrylamide copolymer hydrogel or the acrylamide homopolymer hydrogel is vacuum dried in a vacuum drying oven at a temperature of 40° C. to 60° C. for 4 h to 8 h so that water in the acrylic acid-acrylamide copolymer hydrogel or the acrylamide homopolymer hydrogel sublimes to obtain a dry filament of the acrylic acid-acrylamide copolymer or a dry filament of the acrylamide homopolymer.

The polymerization reaction tube completely reacted in step 102 is placed in the vacuum drying oven, and the vacuum degree is required to be not less than 0.08 MPa. Vacuum drying is carried out to completely dry the trace moisture in the acrylic acid-acrylamide copolymer hydrogel or the acrylamide homopolymer hydrogel in the polymerization reaction tube to obtain the dry filament of the acrylic acid-acrylamide copolymer or the dry filament of the acrylamide homopolymer.

In step 104, the polymerization reaction tube containing the dry filament of the acrylic acid-acrylamide copolymer or the dry filament of the acrylamide homopolymer is cut into a plurality of short polymerization reaction tubes having a preset length and containing the dry filament of the acrylic acid-acrylamide copolymer or the dry filament of the acrylamide homopolymer.

The polymerization reaction tube completely dried in step 103 is cut into 5 cm to 15 cm short polymerization reaction tubes with a blade and the dry filament of the acrylic acid-acrylamide copolymer or the dry filament of the acrylamide homopolymer is pushed out of the short polymerization reaction tubes by a stainless steel wire matching the inner cavity of the short polymerization reaction tubes in terms of inner diameter. The diameter of the stainless steel wire is 0.02 mm to 0.06 mm less than the inner diameter of the polymerization reaction tube.

In step 105, the dry filament of the acrylic acid-acrylamide copolymer or the dry filament of the acrylamide homopolymer is soaked in a soaking solution at a preset ratio for 24 h to 36 h to obtain an expanded filament of the acrylic acid-acrylamide copolymer or an expanded filament of the acrylamide homopolymer.

The dry hydrogel filament obtained in step 104 is soaked in the soaking solution for the purpose of fully removing the residual low molecular monomers out of the dry filament of the acrylic acid-acrylamide copolymer or the dry filament of the acrylamide homopolymer. The soaking solution here is purified water or water for injection. The preset ratio refers to a ratio of the volume (in a unit of ml) of the soaking solution to the length (in a unit of cm) of the dry filament of the acrylic acid-acrylamide copolymer or the dry filament of the acrylamide homopolymer and the ratio is within a range of 2 to 10. During the soaking process, the diameter and length of the dry filament will increase significantly. After the soaking is completed, the expanded filament will be obtained.

In step 106, two ends of the expanded filament of the acrylic acid-acrylamide copolymer or the expanded filament of the acrylamide homopolymer are fixed so that the expanded filament is naturally dried to obtain an acrylic acid-acrylamide copolymer hydrogel filament or acrylamide homopolymer hydrogel filament having a preset outer diameter.

Two ends of the expanded filament of the acrylic acid-acrylamide copolymer or the expanded filament of the acrylamide homopolymer obtained in step 105 are fixed so that the expanded filament is naturally dried at room temperature. During the natural drying process, water in the expansion filament volatilizes, and the diameter of the expansion filament of the acrylic acid-acrylamide copolymer or the expansion filament of the acrylamide homopolymer becomes thinner uniformly. After the expanded filament of the acrylic acid-acrylamide copolymer or the expanded filament of the acrylamide homopolymer is completely dried, the acrylic acid-acrylamide copolymer hydrogel filament or acrylamide homopolymer hydrogel filament having a preset outer diameter is obtained. The hydrogel filament prepared here is ultra-fine and uniform.

In a specific example, a prepared reaction solution of an acrylamide homopolymer was pumped into a high-density polyethylene polymerization reaction tube with an inner diameter of 0.4 mm, placed in a constant-temperature drying oven at a temperature of 60° C., and fully cross-linked for 6 h to obtain an acrylamide homopolymer hydrogel. The acrylamide homopolymer hydrogel was placed in a constant-temperature drying oven for baking reaction at a temperature of 50° C. and vacuum dried for 8 h to obtain a dry filament of the acrylamide homopolymer. The polymerization reaction tube containing the dry filament of the acrylamide homopolymer was cut into 15 cm to 50 cm short tubes. The dry filament of the acrylamide homopolymer was pushed out of the polymerization reaction tubes and soaked in water for injection for 36 h (the ratio of the volume of the water for injection to the length of the dry filament of the acrylamide homopolymer is 4), and then dried naturally to obtain a uniform acrylamide homopolymer hydrogel filament with an outer diameter of about 0.08 mm and a length of 15 cm to 50 cm.

In the first embodiment of the disclosure, there is provided a method for preparing an ultra-fine and uniform acrylamide-based polymer hydrogel filament. According to the method, a reaction solution of an acrylamide-based polymer is prepared under an ice bath condition and then pumped into a polymerization reaction tube; the polymerization reaction tube is parabolically suspended in a constant-temperature drying oven for baking reaction so that the reaction solution is fully cross-linked to form an acrylamide-based polymer hydrogel; hydrogel is then dried in a vacuum drying oven to obtain a dry filament of the acrylamide-based polymer; the polymerization reaction tube is cut into short tubes and the dry filament of the acrylamide-based polymer is pushed out of the short tubes by a stainless steel wire and soaked in a soaking solution to obtain an expanded filament of the acrylamide-based polymer filament; and two ends of the expanded filament are fixed so that the expanded filament is dried naturally to obtain an ultra-fine and uniform acrylamide-based polymer hydrogel filament. The processing length of the acrylamide-based polymer hydrogel filament can be customized according to the needs.

In the second embodiment of the disclosure, there is provided use of an ultra-fine and uniform acrylamide-based polymer hydrogel filament for modifying embolic material coils used in an aneurysm surgery, which can reduce the number of coils used, reduce the mass effect of coils, obtain a higher long-term embolization rate, and reduce a recurrence rate and a retreatment rate.

Figure 2:
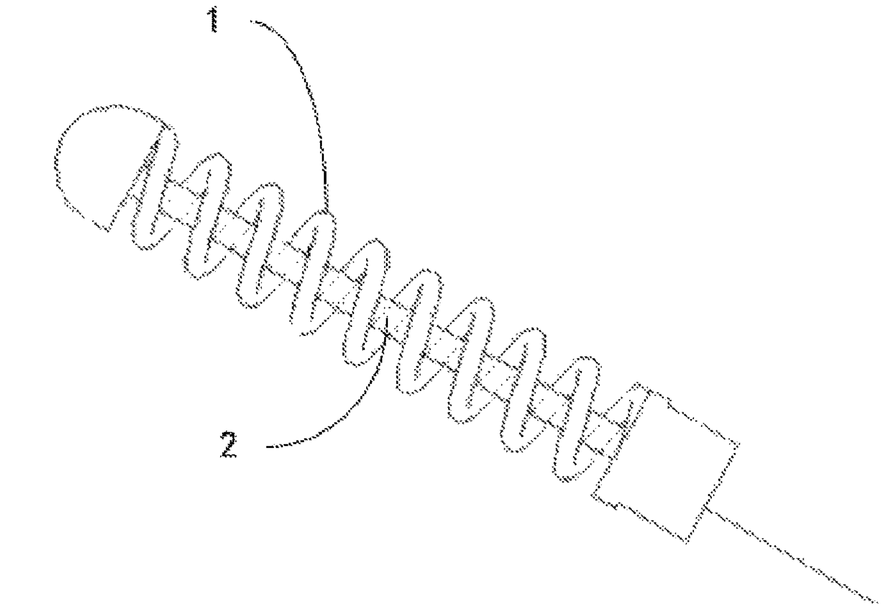
FIG. 2 is a schematic diagram showing use of an ultra-fine and uniform acrylamide-based polymer hydrogel filament for modifying a coil according to a second embodiment of the disclosure.
Figure 3:
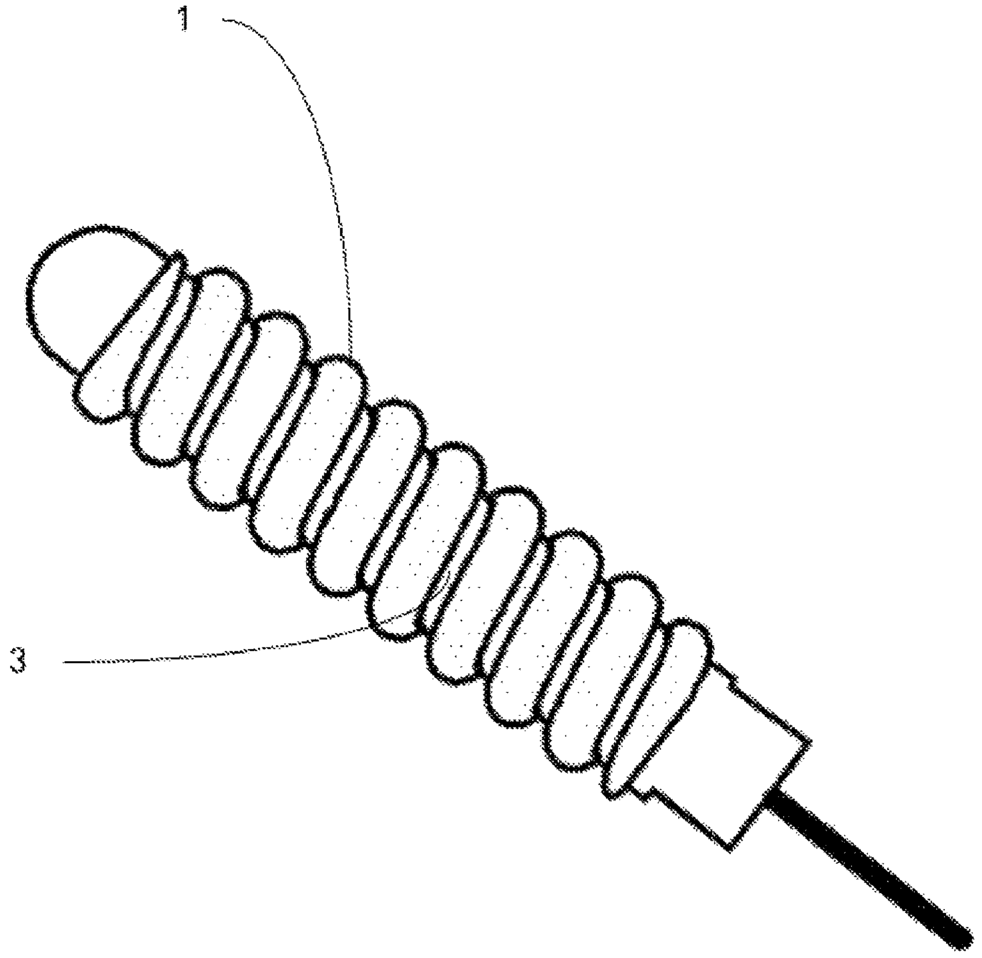
FIG. 3 is another schematic diagram showing the use of an ultra-fine and uniform acrylamide-based polymer hydrogel filament for modifying a coil according to the second embodiment of the disclosure.

FIG. 2 is a schematic diagram showing use of an ultra-fine and uniform acrylamide-based polymer hydrogel filament for modifying a coil according to the second embodiment of the disclosure; and FIG. 3 is another schematic diagram showing the use of an ultra-fine and uniform acrylamide-based polymer hydrogel filament for modifying a coil according to the second embodiment of the disclosure. As shown in FIG. 2 and FIG. 3, a dry acrylamide polymer hydrogel filament 2 is inserted in a coil 1, and then expands with water to become an expanded acrylamide polymer hydrogel filament 3, the expanded acrylamide polymer hydrogel filament 3 full fills the inner cavity of the coil 1.

Even if ordinary platinum coils show complete dense embolism on imaging, the actual filling rate is only 20% to 30%, and the remaining 70% to 80% need to be filled by thrombus. However, the thrombus is unstable, and it may be dissolved, causing the aneurysm to recur. Ordinary platinum coils may also be compressed under the impact of blood flow, causing the aneurysm to recur. The use of the coil modified with the ultra-fine and uniform acrylamide-based polymer hydrogel filament can reduce the number of coils used, reduce the mass effect of coil products, obtain a higher long-term embolization rate, and reduce a recurrence rate and a retreatment rate.

In the second embodiment of the disclosure, there is provided use of an ultra-fine and uniform acrylamide-based polymer hydrogel filament for modifying embolic material coils used in an aneurysm surgery, which can reduce the number of coils used, reduce the mass effect of coils, obtain a higher long-term embolization rate, and reduce a recurrence rate and a retreatment rate.

The specific embodiments described above further explain the objects, technical solutions and beneficial effects of the disclosure. It should be understood that the above descriptions are only specific embodiments of the invention, and not intended to limit the scope of the disclosure. Any modifications, equivalents, improvements and the like made without departing from the spirit and principle of the disclosure should fall within the scope of the disclosure.

What is claimed is:

1. A method for preparing an acrylamide-based polymer hydrogel filament, comprising:

preparing a reaction solution of an acrylamide-based polymer under an ice bath condition, and pumping the reaction solution into a polymerization reaction tube by a syringe, wherein the acrylamide-based polymer comprises an acrylic acid-acrylamide copolymer or an acrylamide homopolymer, the reaction solution of the acrylic acid-acrylamide copolymer comprises 0.03 g/mL to 0.05 g/mL of sodium hydroxide, 0.07 g/mL to 0.14 g/mL of acrylic acid, 1.07 g/mL to 2.13 g/mL of acrylamide, 0.0005 g/mL to 0.001 g/mL of an amine crosslinking agent and 0.0009 g/mL to 0.0025 g/mL of an initiator, and the reaction solution of the acrylamide homopolymer comprises 0.03 g/mL to 0.05 g/mL of sodium hydroxide, 1.07 g/mL to 2.13 g/mL of acrylamide, 0.0005 g/mL to 0.001 g/mL of an amine crosslinking agent and 0.0009 g/mL to 0.0025 g/mL of an initiator, wherein the polymerization reaction tube has a length of 50 cm to 100 cm;

parabolically bending the polymerization reaction tube with two ends upward;

suspending the parabolically bent polymerization reaction tube in a constant-temperature drying oven at a temperature of 40° C. to 60° C. for 2 h to 8 h for baking reaction so that components in the reaction solution are fully cross-linked to obtain an acrylic acid-acrylamide copolymer hydrogel or an acrylamide homopolymer hydrogel;

vacuum drying the polymerization reaction tube containing the acrylic acid-acrylamide copolymer hydrogel or the acrylamide homopolymer hydrogel in a vacuum drying oven at a temperature of 40° C. to 60° C. for 4 h to 8 h so that water in the acrylic acid-acrylamide copolymer hydrogel or the acrylamide homopolymer hydrogel sublimes to obtain a dry filament of the acrylic acid-acrylamide copolymer or a dry filament of the acrylamide homopolymer;

cutting the polymerization reaction tube containing the dry filament of the acrylic acid-acrylamide copolymer or the dry filament of the acrylamide homopolymer into a plurality of short polymerization reaction tubes having a preset length and containing the dry filament of the acrylic acid-acrylamide copolymer or the dry filament of the acrylamide homopolymer, wherein the preset length is within a range of 5 cm to 15 cm;

pushing the dry filament of the acrylic acid-acrylamide copolymer or the dry filament of the acrylamide homopolymer out of the short polymerization reaction tubes by a stainless steel wire matching the short polymerization reaction tubes in terms of inner diameter;

purifying the dry filament of the acrylic acid-acrylamide copolymer or the dry filament of the acrylamide homopolymer with a soaking solution at a preset ratio for 24 h to 36 h to obtain an expanded filament of the acrylic acid-acrylamide copolymer or an expanded filament of the acrylamide homopolymer; and fixing two ends of the expanded filament of the acrylic acid-acrylamide copolymer or the expanded filament of the acrylamide homopolymer and naturally drying the expanded filament of the acrylic acid-acrylamide copolymer or the expanded filament of the acrylamide homopolymer to obtain an acrylic acid-acrylamide copolymer hydrogel filament or acrylamide homopolymer hydrogel filament having a preset outer diameter.

2. The method of claim 1, wherein the polymerization reaction tube has an inner diameter of 0.2 mm to 0.5 mm.

3. The method of claim 1, wherein a material of the polymerization reaction tube comprises polypropylene, polyethylene, polyamide (PA) or polyethylene terephthalate.

4. The method of claim 1, wherein in the step of suspending the parabolically bent polymerization reaction tube in the constant-temperature drying oven at a temperature of 40° C. to 60° C. for 2 h to 8 h for baking reaction, the baking reaction is carried out at 50° C.

5. The method of claim 1, wherein a vacuum degree of the vacuum drying oven is not less than 0.08 MPa.

6. The method of claim 1, wherein the soaking solution is purified water or water for injection; and the preset ratio refers to a ratio of a volume of the soaking solution to the length of the dry filament of the acrylic acid-acrylamide copolymer or the dry filament of the acrylamide homopolymer and the ratio is within a range of 2 to 10.

7. The method of claim 1, wherein the preset outer diameter is 0.08 mm.

8. A method of modifying an embolic material coil using the acrylamide-based polymer hydrogel filament prepared by the method of claim 1, comprising;

inserting a dry acrylamide-based polymer hydrogel filament in the embolic material coil; and expanding the dry acrylamide-based polymer hydrogel filament with water to become an expanded acrylamide-based polymer hydrogel filament that fills the inner cavity of the embolic material coil.

* * * * *